July 20, 1948.　　　F. D. LUTERAN　　　2,445,488
PIECE CUTTING MACHINE
Filed Oct. 14, 1943　　　　　　2 Sheets-Sheet 1
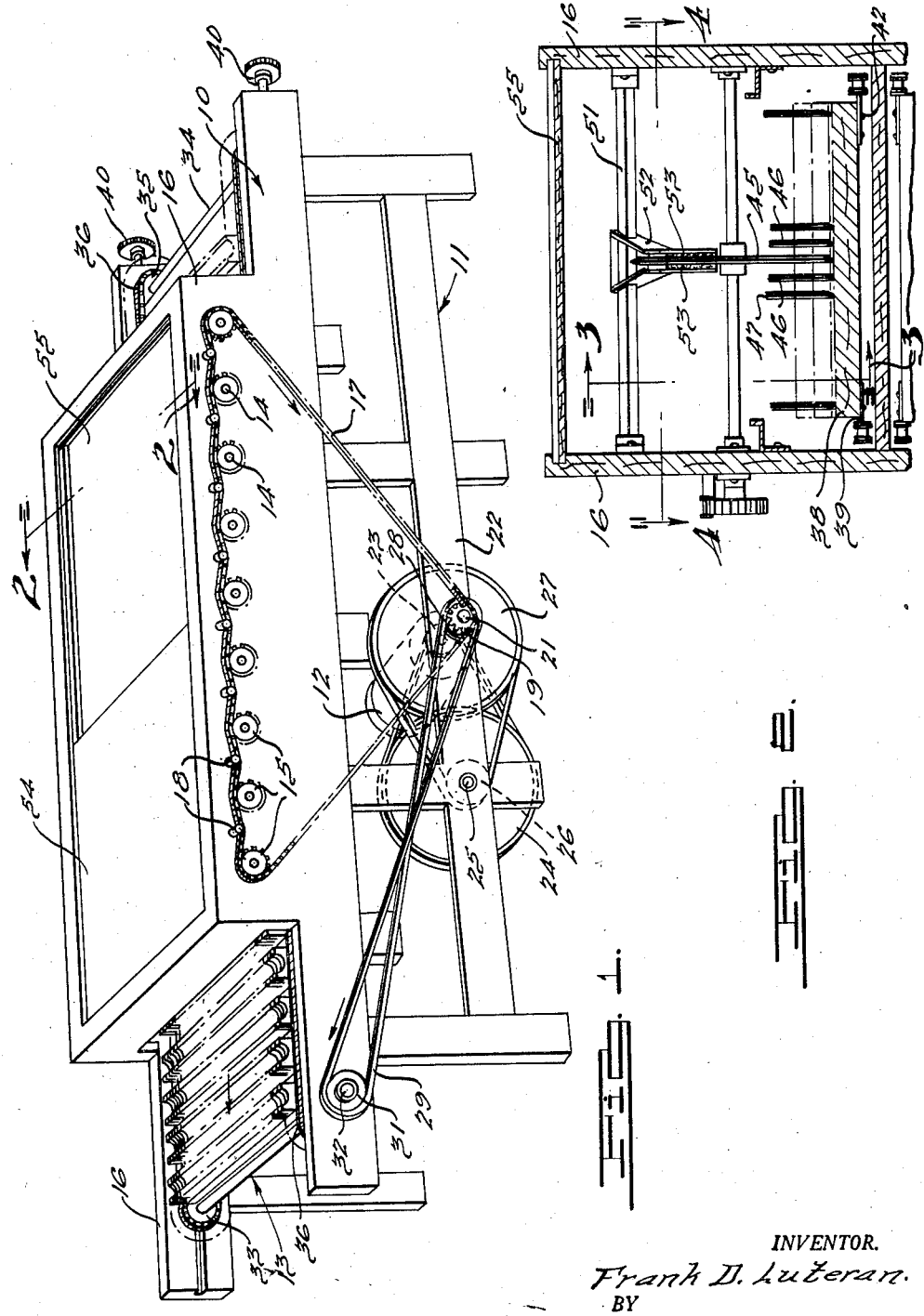
INVENTOR.
Frank D. Luteran.
BY
Harness, Dickey & Pierce.
ATTORNEYS.

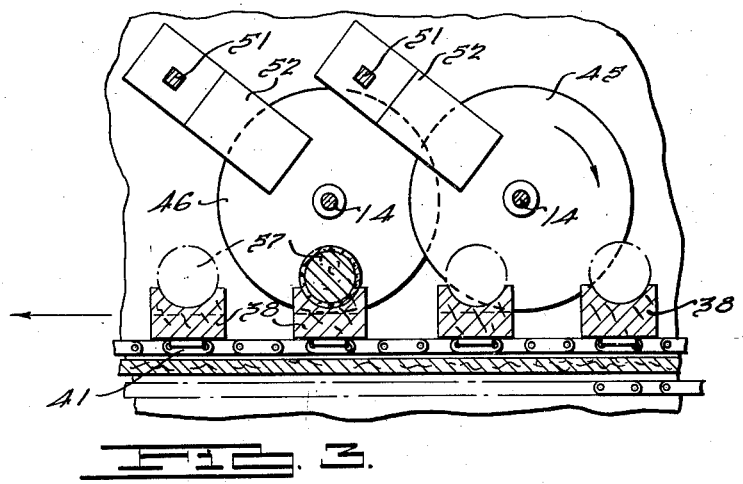
FIG. 3.
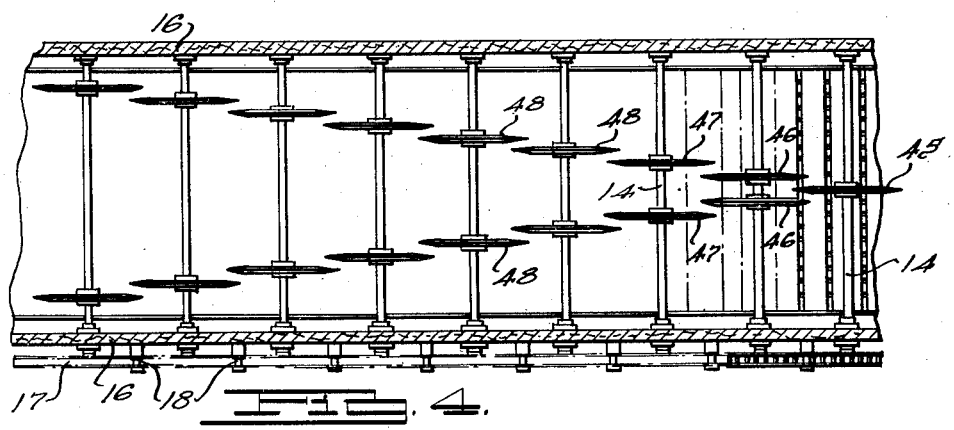
FIG. 4.
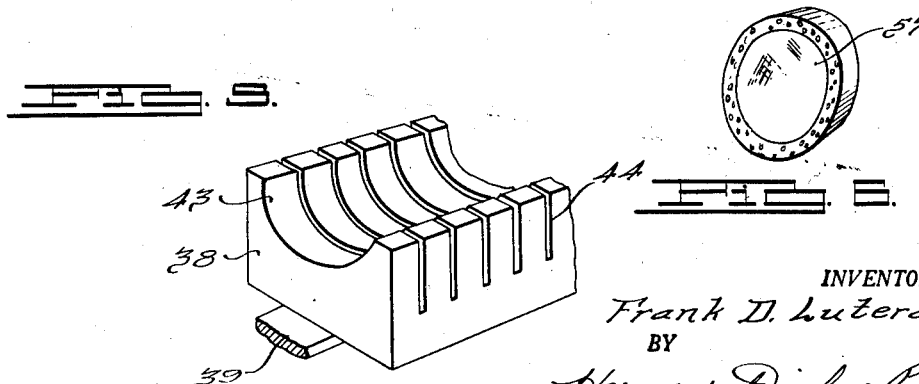
FIG. 5.
FIG. 6.
INVENTOR.
Frank D. Luteran.
BY
Harness, Dickey & Pierce
ATTORNEYS.

Patented July 20, 1948

2,445,488

UNITED STATES PATENT OFFICE 2,445,488

PIECE CUTTING MACHINE

Frank D. Luteran, Dearborn, Mich.

Application October 14, 1943, Serial No. 506,133

8 Claims. (Cl. 107—22)

This invention relates to cutting machines and particularly to a machine for cutting pieces of predetermined length from an elongated element without crowding the pieces one upon the other.

The machine of the present invention may be employed for cutting any element into sections of predetermined length and is particularly useful for cutting lengths of candy into a plurality of pieces. Certain kinds of candy are made up in rolls of a length to be received by the width of the machine and are placed upon carriers which are attached to a continuous conveyor for moving the rolls under the cutting elements. The cutting elements are preferably rotatable cutting discs which are mounted in echelon to the right and left of a central blade, in V-formation. The candy rolls are fed into the central blade first to cut the rolls into two halves, which are moved apart the width of the blade. The carrier moves the two halves into the next adjacent pair of blades and a piece of candy is cut from each inner adjacent end of the halves and are moved toward each other into substantially abutting relation. Each of the two blades will move the severed pieces of candy inwardly half the thickness of the blade, or the thickness of the first blade which severed the bar into the two halves. The carrier moves the two remaining portions of the roll halves into the next adjacent pair of blades which sever two pieces of candy from the inner ends thereof. The roll halves are moved outwardly and the severed pieces are moved inwardly half the thickness of the blade and are spaced apart the thickness of the blade. The severed pieces will be spaced from the pieces severed prior thereto a distance equal to half the thickness of the blade. The two remaining portions of the rolls are continuously moved in this manner through the pairs of blades which are spaced further apart progressively from the front to the rear end of the machine. The pieces of candy are cut from the rolls without contacting or crowding each other and without compressing the rolls as occurred when all of the pieces were cut from the ends inwardly toward the center of the rolls, or when all of the pieces were cut simultaneously.

Accordingly, the main objects of this invention are: to arrange a plurality of cutting blades in echelon both right and left-handed from a central blade for cutting a roll into pieces without compacting any portion of the pieces or roll; to provide a machine with a plurality of rotating blades which are mounted in pairs in V-formation from a single front blade; to construct a machine having a continuous belt made up of a plurality of candy roll carriers having slots aligned with a plurality of cutting blades which are mounted in pairs rearwardly of a single front blade and progressively spaced a greater distance apart depending upon the spacing of the slots and thicknesses of the pieces of candy to be severed; to drive a belt having a plurality of carriers thereon under a plurality of driven cutting discs which are disposed in V-formation for initially severing the candy roll, or other element, into two parts and for thereafter cutting pieces therefrom progressively from the inner adjacent ends of the parts; and, in general, to provide a candy cutting machine which is simple in construction, positive in operation and economical of manufacture.

Other objects and features of novelty of this invention will be specifically pointed out or will become apparent when referring, for a better understanding of the invention, to the following description taken in conjunction with the accompanying drawings, wherein:

Figure 1 is a perspective view of a candy cutting machine embodying features of this invention;

Fig. 2 is a sectional view of the machine illustrated in Fig. 1, taken on the line 2—2 thereof;

Fig. 3 is an enlarged sectional view of the structure illustrated in Fig. 2, taken on the line 3—3 thereof;

Fig. 4 is a reduced sectional view of the structure illustrated in Fig. 2, taken on the line 4—4 thereof;

Fig. 5 is a broken view in perspective of one end of a carrier forming the conveying portion of the machine illustrated in Fig. 1; and Fig. 6 is a perspective view of a piece of candy which has been severed by the machine illustrated in Fig. 1.

In the figures, the body 10 of the candy severing machine is illustrated as being mounted on a base 11, upon which a motor 12 is supported for driving a conveyor 13 and a plurality of blade carrying shafts 14. The shafts 14 have a sprocket wheel 15 attached thereto near one side element 16 of the body 10. A chain 17 is disposed over the sprocket wheels 15 and are forced downwardly thereover at the top by idler rollers 18 which are disposed in contact with the top of the chain between the sprocket wheels. A sprocket wheel 19 is mounted upon a shaft 21 supported upon the frame element 22 of the base. A pulley 23 on the shaft of the motor drives a pulley 24, the shaft 25 of which carries a pulley 26 which drives a pulley 27 mounted on the shaft 21. This train of pulleys reduces the speed of operation of the chain 17 and of the conveyor 13.

A pulley 28 on the shaft 21 drives a belt 29 which drives a pulley 31 and shaft 32 on which sprocket wheels 33 are keyed adjacent to the inner faces of the side elements 16. A shaft 34 is mounted on the opposite end of the body 10 having a pair of sprocket wheels 35 secured thereon near the inner faces of the elements 16. Sprocket chains 36 are mounted over the sprocket wheels 33 and 35 to be driven in unison by the operation of the belt 29. A plurality of candy roll carriers 38 are supported in spaced relation to each other on the chains 36 by the supporting plates 39 which are attached to the chain links 41. The inner end of the plates 39 are secured to the underside of the carriers 38 by a pair of screws 42. The carriers are provided with a concave recess 43 for receiving the element, or rolls, to be cut into the plurality of pieces, the surface of which is interrupted by a plurality of slots 44 spaced apart the width of the piece to be severed.

The shafts 15 extend across the side elements 16 of the body 10 and have disc-shaped cutting blades mounted thereon. The frontmost shaft 15 has a cutting blade 45 keyed, or otherwise secured, thereto at the central point of the shaft. When the carriers move the elements to be severed toward this blade, the blade will cut the elements into two halves and it is from the interjacent ends of these halves that subsequent pieces will be severed.

The next adjacent shaft 15 is provided with a pair of blades 46 which are spaced from each other a distance equal to twice the length of a piece to be severed and the thickness of one of a blade. The thickness of the blade is taken into consideration because of the movement of the two halves away from each other when severed by the blade 45 which spaces the two ends of the halves apart the width of the blade.

The next adjacent shaft 15 has a pair of blades 47 mounted, the cutting edges of which are spaced outwardly from cutting edges of the blades 46, a distance equal to the thickness of the pieces to be cut and one-half of the blade thickness. Additional pairs of blades 48 are similarly spaced further apart from the adjacent blades, when mounted on additional shaft, for successfully severing pieces of candy from the inner ends of the remainder of the two halves of the element, or candy rolls. With this arrangement, none of the pieces of candy interfere with each other during the severing operations.

Bars 51 are mounted across the top portion of the side elements 16 for supporting spring brackets 52 having wiping pads 53 on their inner surfaces which engage the side of each blade and collect any particles of the candy, or other material, being severed and apply a lubricant to prevent the candy, or other material, from adhering thereto. A bar 51 is provided for each of the rows of blades having brackets 52 thereon, which support the wiping pads 53 in engagement with the blade adjacent thereto. Slide covers 54 and 55 are mounted in slots on the inner face of the side element 16 for covering the blades, while rendering them accessible when the blades, or other portion of the machine, are to be examined or repaired. The shaft 34 has its ends mounted in slides which are adjustable by the lead screws 40 for adjusting the tension on the chains 36 of the conveyor 13.

In operation, when candy rolls, or other material, is to be severed into like pieces, the rolls are disposed seriatim in the carriers 38 as they are advanced by the driving mechanism of the machine past the first cutting blade 45, as the blade is rotated downwardly toward the rolls. The belt 29 is twisted so as to produce movement in these directions from the operation of the shaft 21. As the bars are advanced from right to left in the machine, as illustrated in the figures, the bar is first cut in half by the blade 45. Thereafter, as the carriers are continuously driven, the two halves will be carried under successive blades to have pieces cut from the inner end thereof until the carrier passes from the blades and the severed candy may be removed, or be delivered to a container under the left-hand end of the machine, when the carriers revolve about the shaft 32.

It is only necessary to place the candy rolls, or lengths of other material, on the carriers at the right-hand end of the machine to have the pieces severed without interfering with each other or having the pieces compacted, or deformed. A piece of candy 57 is shown in Fig. 6, for the purpose of illustration, and it is to be understood that the machine and the method embodied thereon is not to be limited to this particular application as the machine is useful for severing any material, when it is desired to retain the severed pieces out of contact with each other without being compacted or deformed.

What I claim as my invention:

1. The method of severing a length of material into a plurality of like pieces which includes the steps: of cutting the length into two halves and spreading the halves apart, and of thereafter simultaneously cutting pieces from the inner ends of the halves while moving the pieces from each other in the spaces between the halves.

2. The method of cutting a length of material into a plurality of like pieces which includes the steps: of advancing the length through a plurality of cutting blades, of first severing the length into two halves and moving the halves apart the width of the cutting blade, and of thereafter severing pieces from the inner ends of the halves as they are advanced through the blades to have the remainder of the pieces move toward each other a distance equal to half the thickness of the blades.

3. The method of severing pieces of candy from a candy roll which includes the steps: of advancing the roll with its longitudinal axis disposed transversely of the machine, of severing the roll when passed through a machine into two halves so that the halves may move apart without distortion, and thereafter simultaneously severing pieces from each adjacent end of the halves as they are moved toward each other without being distorted.

4. The method of severing pieces of candy from a candy roll which includes the steps: of advancing the roll with its longitudinal axis disposed transversely of the machine, of severing the roll when passed through a machine into two halves and spreading the halves apart, thereafter simultaneously severing pieces from each adjacent end of the halves while moving the pieces toward each other in the space between the halves, and of simultaneously severing additional pieces from adjacent ends of the halves as the remaining portions of the halves are advanced through additional pairs of cutting blades while moving the severed pieces toward each other in the spaces therebetween.

5. In a machine for severing lengths of material into a plurality of individual pieces which includes, in combination, a frame, a base supporting said frame, a carrier in said frame by which the lengths are carried through the machine, a plurality of cutting blades mounted in said machine in diverging relation from a front central blade which initially severs the length into two halves and spaces the halves apart so that the blades diverging therefrom can cut pieces from the halves without compressing the material, and means for driving the carrier.

6. In a machine for severing lengths of material into a plurality of individual pieces which includes, in combination, a frame, a base supporting said frame, a carrier in said frame by which the lengths are carried through the machine, a plurality of cutting blades mounted in said machine in diverging relation from a front central blade which initially severs the length into two halves and spaces the halves apart so that the blades diverging therefrom can cut pieces from the halves without compressing the material, means for driving the carrier toward the blades in a direction to first contact the central blade, and means for rotating the blades to have the peripheral edge move downwardly toward the lengths as they are advanced.

7. In a machine for severing lengths of material into a plurality of individual pieces which includes, in combination, a frame, a base supporting said frame, a carrier in said frame by which the lengths are carried through the machine, a plurality of cutting blades mounted in said machine in diverging relation from a front central blade which initially severs the length into two halves and spaces the halves apart so that the blades diverging therefrom can cut pieces from the halves without compressing the material, and means for driving the carrier toward the blades in a direction to first contact the central blade.

8. In a machine for severing lengths of material into a plurality of individual pieces which includes, in combination, a frame, a base supporting said frame, a carrier in said frame by which the lengths are carried through the machine, a plurality of cutting blades mounted in said machine in diverging relation from a front central blade which initially severs the length into two halves and spaces the halves apart so that the blades diverging therefrom can cut pieces from the halves without compressing the material, and means for rotating the blades to have the peripheral edge move downwardly toward the lengths as they are advanced.

FRANK D. LUTERAN.

REFERENCES CITED

The following references are of record in the file of this patent:

UNITED STATES PATENTS

| Number | Name | Date |
| --- | --- | --- |
| 645,862 | Letson et al. | Mar. 20, 1900 |
| 1,397,198 | Alchin | Nov. 15, 1921 |
| 1,418,511 | Ayala | June 6, 1922 |
| 1,993,466 | Van Berkel | Mar. 5, 1935 |

FOREIGN PATENTS

| Number | Country | Date |
| --- | --- | --- |
| 444,510 | Germany | May 21, 1927 |

Certificate of Correction

Patent No. 2,445,488. July 20, 1948.

FRANK D. LUTERAN

It is hereby certified that errors appear in the printed specification of the above numbered patent requiring correction as follows: Column 4, lines 58 and 68, claims 3 and 4, respectively, strike out the words "when passed through a machine"; same column, line 55, claim 3, and line 65, claim 4, before "which" insert *when passed through a machine*; and that the said Letters Patent should be read with these corrections therein that the same may conform to the record of the case in the Patent Office.

Signed and sealed this 5th day of October, A. D. 1948.

[SEAL]

THOMAS F. MURPHY,
*Assistant Commissioner of Patents.*